United States Patent [19]
Rich et al.

[11] Patent Number: 5,981,040
[45] Date of Patent: Nov. 9, 1999

[54] HOLOGRAPHIC IMAGING

[75] Inventors: Benny R. Rich, Oakwood; Jon M. Brawner, Duluth, both of Ga.

[73] Assignee: Dittler Brothers Incorporated, Atlanta, Ga.

[21] Appl. No.: 08/738,715

[22] Filed: Oct. 28, 1996

[51] Int. Cl.⁶ ............................. B32B 3/00; B32B 5/16; G03H 1/08
[52] U.S. Cl. .................. 428/209; 359/9; 428/323
[58] Field of Search ...................... 428/209, 323; 359/9

[56] References Cited

U.S. PATENT DOCUMENTS

| | | | |
|---|---|---|---|
| 5,200,253 | 4/1993 | Yamaguchi et al. | 428/195 |
| 5,464,690 | 11/1995 | Boswell | 428/334 |
| 5,532,046 | 7/1996 | Rich et al. | 428/202 |

*Primary Examiner*—Frank C. Eisenschenk
*Assistant Examiner*—Hankyel T. Park
*Attorney, Agent, or Firm*—Dean W. Russell; Geoff L. Sutcliffe; Kilpatrick Stockton LLP

[57] ABSTRACT

A holographic image produced by the impression of a shim onto a metallic ink coating comprising a plurality of metallic particles suspended in a resinous ink binder. A resinous or substantially tactile and nonresilient undercoat can be applied to the substrate also to receive the impression of the shim and to create more distinct holographic imagery. A substantially clear overcoat can also be applied over the metallic ink coating to enhance the reflectivity of the image.

31 Claims, 2 Drawing Sheets

HOLOGRAPHIC IMAGING

FIELD OF THE INVENTION

This invention is in the field of holographic imaging.

BACKGROUND

Because holographic images are not readily copied by commercial photocopiers, they are frequently integrated into such sensitive items as stock certificates, travelers checks, identification cards, and credit cards for enhanced security. The cost, expense, and potential for security breaches associated with holographic image processes have, however, inhibited the use of holographic images in a number of applications, including game cards.

Conventional holographic images are produced by a stamping process in which a shim, having the mirror image of a three dimensional holographic image formed thereon, is impressed into a reflective surface. The stamped impression causes light to reflect in varying directions from the reflective surface in the form of the holographic image. In one method the shim is impressed into a metallic foil adhered to a substrate. This method is often cost-prohibitive, however, because the step of adhering the metallic foil to a substrate cannot readily be integrated into conventional printing operations. Boswell, U.S. Pat. No. 5,464,690 (incorporated by reference herein), discloses a holographic imaging process in which a shim is impressed into a reflective surface formed by vapor deposition of metallic particles onto a substrate. Boswell's process also may be cost-prohibitive in some circumstances because of the complexity and expense of the vapor deposition process.

In the foregoing holographic imaging processes, a glossy transparent coating may be applied over the holographic image in order to enhance its iridescence or gloss. In another holographic imaging process a glossy transparent coating is applied over a reflective surface before a holographic image is impressed onto the item. The glossy transparent coating is itself impressed by the shim and, depending upon the depth of the impression and the thickness of the transparent coating, the reflective surface may or may not be impressed in the process. The impression of the transparent coating causes light that is reflected from the reflective surface, and which passes through the transparent coating, to refract and thereby create a holographic image.

Because of the complexity and expense of equipment required to manufacture items incorporating holographic images, holographic imaging traditionally has been performed at separate specialty manufacturing sites. The holographic images often are formed on labels that are transported to a separate manufacturing facility to be applied to sensitive items. Because the holographic imaging is performed at a separate site, however, there is a greater potential for illicit application of holographic labels to counterfeit goods, by theft of the holographic labels, than if the holographic imaging were performed on-site. To overcome this problem Boswell, supra, has developed a label that is manufactured at a separate site, but which is applied to the sensitive item and stamped by a shim at the same site that the sensitive items are manufactured. Boswell's process still requires, however, that labels be manufactured at and transported from a separate site, and that a separate label application step be included in the manufacturing process.

SUMMARY OF THE INVENTION

A process for printing holographic images to sensitive documents and the like has been developed in which a special metallic ink is printed, often by conventional flexographic or rotogravure printing processsses, to a sensitive document to form a reflective coating. The reflective coating is subsequently embossed by a shim. The areas of the reflective coating that are impressed by the shim reflect light in a slightly different direction than the reflection from the remainder of the reflective coating, thereby creating a holographic image. The process can be performed continuously in one operation at one manufacturing site.

The special metallic ink used to print the reflective coating may, if it contains aluminum particles, dry to a semi-glossy gray reflective finish that is receptive to the impression of a shim. The special metallic ink is particularly suitable for receiving a holographic image because it converts, when imprinted, to a more glossy finish in the areas where imprinted, thereby producing a more distinct and illuminating holographic effect.

Additional undercoats and overcoats can also be applied to the item. An undercoat can be applied beneath the metallic ink, for example, to receive the impression of the shim, and to allow the shim to leave a deeper or more distinct impression in the metallic ink. A glossy overcoat can be applied atop the ink either to receive the impression of the shim, or to enhance the reflectivity and durability of the metallic ink.

The process enhances security by integrating the holographic and sensitive item manufacturing operations into one continuous process at one site. The process also is less expensive than conventional holographic imaging processes because the holographic substrate, an ink, can be printed to the sensitive item by conventional flexographic or rotogravure processes. The process also can be adapted to unique applications such as game cards.

It is an object of the invention, therefore, to provide a novel medium for the impression of holographic images.

It is another object of the invention to provide a process in which holographic imaging operations are integrated on-site in one continuous process with other printing operations.

It is a further object of the invention to provide a holographic image medium that can be printed to substrates via conventional printing and flexographic processes.

Another object of the invention is to provide coatings and layers that can be printed to a substrate, either below or atop the holographic image medium, in order to enhance the reflectivity and durability of an impressed holographic image.

A still further object of the invention is to provide unique applications for holographic images, including game cards.

Still other objects, aspects and advantages of the present invention are apparent from the drawings, claims, and specification of this document.

DETAILED DESCRIPTION OF THE FIGURES

Figure 1:
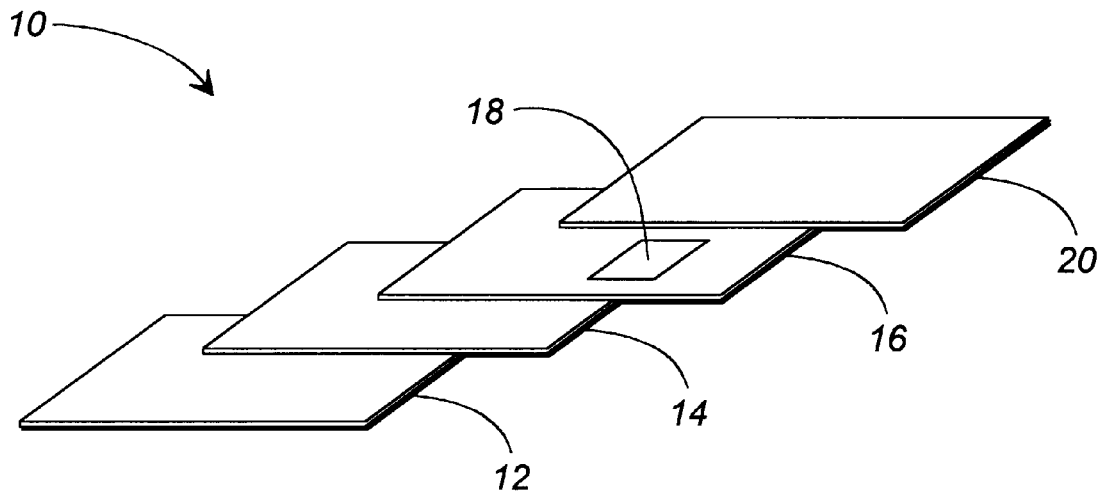
FIG. 1 is an exploded perspective view of an item of the present invention.

FIG. 1 depicts an item 10 of the present invention. Item 10 comprises a substrate 12, a coating 14, a metallic ink 16, a holographic image 18, and an overcoat 20. Other layers and elements, including other coatings and print, can also be integrated into the item, or printed or applied to the item, depending upon the purpose of the item, the use to which the item will be put, and the requirements of the manufacturer or consumer. Item 10 may itself be affixed to a separate substrate.

Substrate 12 may be formed from any material that will receive the coatings applied to substrate 12 and which can withstand the conditions to which the substrate is subjected during manufacture, distribution, and consumer use. Metallic ink 16 is applied atop substrate 12 to simulate the appearance of an item coated by a metallic foil. Metallic ink 16 can be applied atop item 10 by conventional, and relatively inexpensive, flexographic or rotogravure printing processes.

Metallic ink 16 contains metal particles suspended in a resinous ink binder. When metallic ink 16 dries, the metallic particles are dispersed throughout and permanently suspended in a binder, thus forming a continuous, solid film or sheet. If metallic ink 16 contains aluminum particles, then it may dry to a semi-glossy gray reflective finish. In at least one embodiment of item 10, metallic ink 16 comprises by weight, before drying:

| ethyl acetate | 32.50% |
|---|---|
| methyl ethyl ketone | 36.45% |
| vinyl resin | 23.00% |
| black dye | 0.05% |
| aluminum pigment | 8.00% |

The composition of metallic ink 16 can be varied and may typically be varied to adhere best to the particular material with which metallic ink 16 contacts. The composition of metallic ink 16 may generally comprise (by weight) 32–33% ethyl acetate, 30–37% methyl ethyl ketone, 23–24% vinyl resin, 0–0.05% black dye and 8–12% aluminum pigment.

The size and shape of metal particles in metallic ink 16 can be varied to improve the visibility and reflectivity of holographic image 18. The reflectivity of metallic ink 16 appears to increase inversely with the size of the particles. Accordingly, metallic particles that do not exceed 3–5 microns in diameter are typically used. The reflectivity of metallic ink 16 also appears to increase with the flatness and smoothness of the metal particles.

As noted previously, the brightness of metallic ink 16 increases when it is impressed by a shim to create a holographic image. The flatness and method of production of the metal particles also appears to influence the degree to which the brightness of metallic ink 16 is altered when it is impressed. It is believed that flat particles, when pressed upon by a shim, are caused to align better along a plane than rounder and more amorphous particles. The flatter particles more readily form a continuous plane than particles that are not flat, and therefore also create a more reflective surface when impressed to create a holographic image. These flat particles are typically produced via the vacuum deposition of pure aluminium onto plastic films.

Holographic image 18 is impressed by known holographic processes into metallic ink 16 by a shim bearing the mirror image of holographic image 18. Holographic image 18 essentially comprises a pattern of impressions made by the shim in metallic ink 16. Each of the various impressions is at a slight angle from the planar surface of metallic ink 16 so that each of the various impressions reflects light in a different direction than the light reflected from the surface of metallic ink 16. The differing reflective directions cause the surface of metallic ink 16 to exhibit different reflection patterns depending upon the angle at which item 10 is viewed, thereby creating holographic image 18.

Coating 14 can be applied over at least a portion of substrate 12, and beneath metallic ink 16, to serve various functions. If metallic ink 16 does not readily adhere to substrate 12, for example, coating 14 may help to bind metallic ink 16 and substrate 12 together. If properly selected coating 14 can also enhance the illumination of holographic image 18. This enhanced illumination is achieved if, when the shim is impressed into metallic ink 16, it also impresses coating 14, thereby adding depth to holographic image 18, potentially causing greater differences among the angles of light reflection from holographic image 18, and causing better resolution among the varying reflective patterns of holographic image 18.

Resinous materials are particularly suitable for printing coating 14 because they are tactile and nonresilient when impressed. Coating 14 need not, however, be a "resin" to function effectively, and to facilitate the beneficial visual effects described above. Rather, coating 14 may be comprised of curable thermosetting materials, lacquers, thermoplastic materials, and any other type material that is sufficiently tactile and non-resilient to receive an imprint from the shim used to create holographic image 18. Suitable lacquers include acrylic, styrene acrylonitrile, polyethyleneterepthalate, and nitrocellulose, and include both solvent and water-based systems.

While the thickness of coating 14 is not critical, thicknesses in the range of 0.5 microns to 3 microns are suitable from a manufacturing standpoint and in the ability of such a thickness to facilitate the desired holographic illumination. If desired coating 14 may be omitted from item 10 altogether.

Overcoat 20 is another optional coating that may be printed atop metallic ink 16 and holographic image 18. Overcoat 20 typically dries to a clear glossy finish and thus improves the reflectivity of item 10. Overcoat 20 also increases the durability of item 10 and holographic image 18. Matched to and applied atop metallic ink 16, overcoat 20 includes binder components similar to those of metallic ink 16. Overcoat 20 may be comprised, before drying, by weight of:

| ethyl acetate | 32.25% |
|---|---|
| methyl ethyl ketone | 39.75% |
| vinyl resin | 28.00% |

To enhance adherence to metallic ink 16 and any other coatings applied to item 10, the quantity of vinyl resin present in overcoat 20 may typically be varied between 25 and 30%. Suitable ranges for other components of overcoat 20 are 32–33% ethyl acetate and 37–40% methyl ethyl ketone.

Overcoat 20 may also be comprised of other materials. Overcoat 20 may, for example, be an ultraviolet-curable gloss coat, an electron beam-curable gloss coat, or water based gloss coat cured by evaporation. Water based overcoats may be comprised of acrylate, polyester, polystyrene, or other resins emulsified in a water or water-alcohol solvent. The weight percentage of resin in the uncured composition may typically range between 19 and 40% by weight.

Overcoat 20 could, if desired, also act as the receptor of holographic image 18. If, for example, a shim were stamped directly into overcoat 20, the imprint of the shim in overcoat 20 would refract light reflected from metallic ink 16 into different directions, and thereby also produce a holographic image. By impressing the shim into overcoat 20 rather than metallic ink 16, however, the advantage of impressing metallic ink 16 with a shim and causing the metallic ink to become glossier where the ink has been impressed would be lessened or eliminated.

Figure 2:
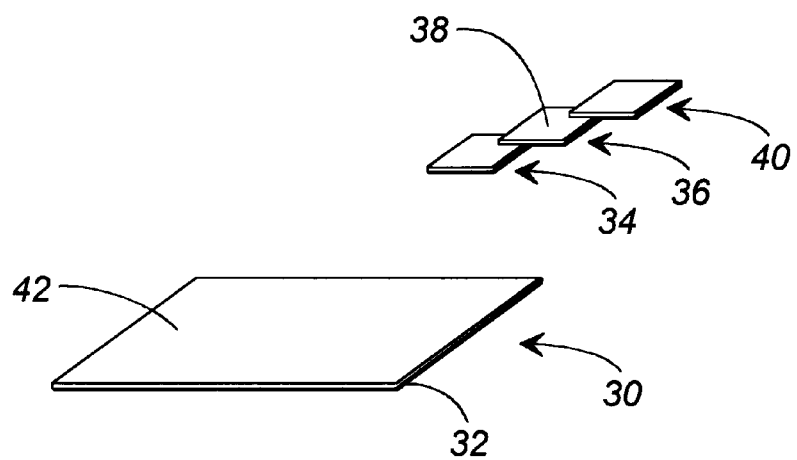
FIG. 2 is an exploded perspective view of an alternative item of the present invention.

Adaptations to item 10 can be made depending upon the particular use to which item 10 is put. For example, item 10 can be integrated into a larger or more complex unit where it could function, for example, on the back of a document. The sizes of the components of item 10 can similarly be varied so that item 10 can be integrated into a larger or more complex unit. Item 30, disclosed in FIG. 2, is one such adaptation of item 10.

Item 30 comprises a substrate 32, a coating 34, metallic ink 36, holographic image 38, and overcoat 40. Item 30 also comprises print 42 that has been applied to the surface of substrate 32. To accommodate print 42, the size of coating 34, metallic ink 36, and overcoat 40, have been minimized to approximate more closely the size of holographic image 38.

The construction of item 30 can, of course, be varied, by the integration of additional layers, substrates, and print, or by variations in the size or relative size of the elements. The construction and geometry of item 30 as illustrated is, however, particularly adaptable to documents and other things in which one desires to print a holographic image to the face of the document without obstructing print or other elements on the face of such document.

Figure 3:
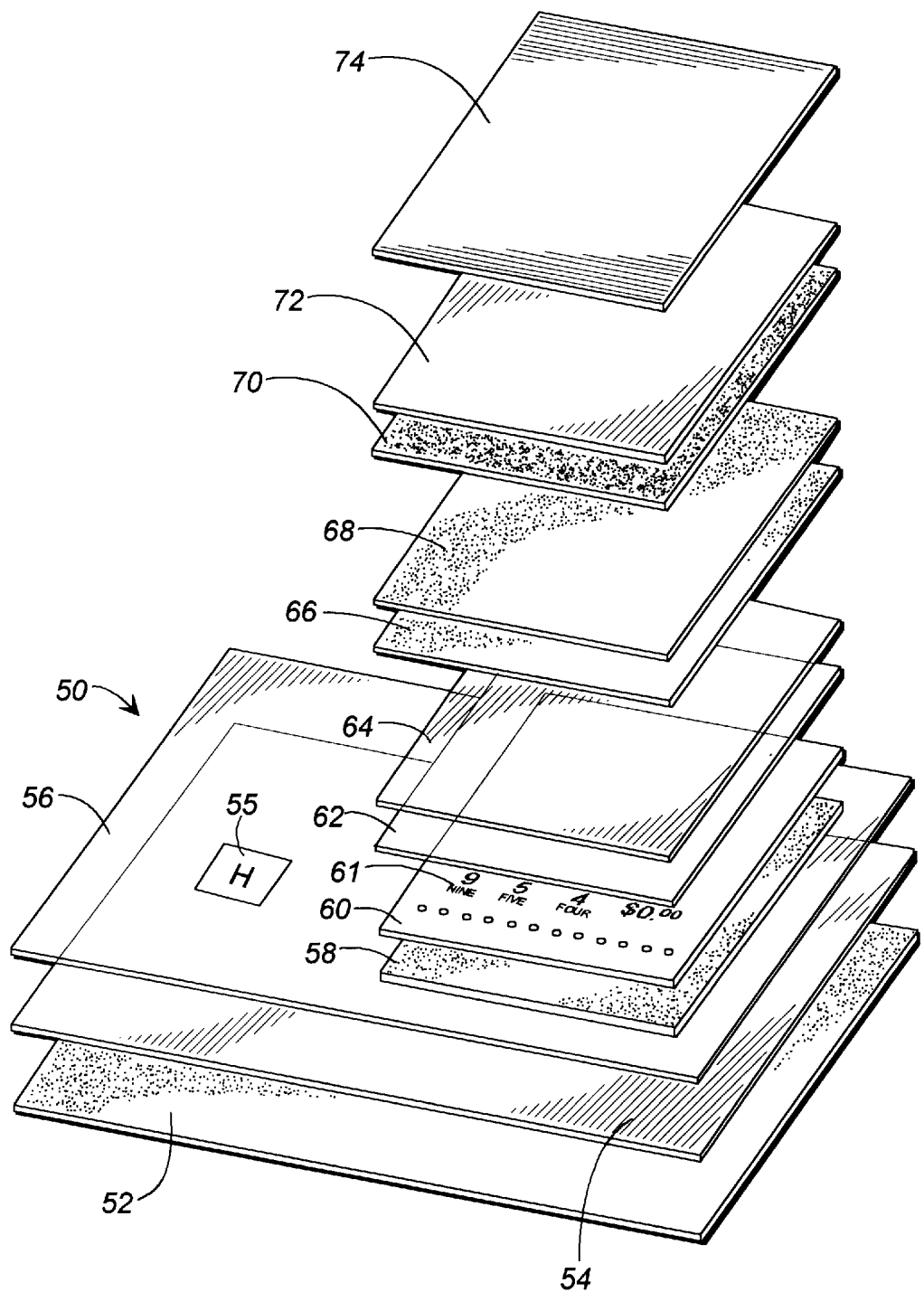
FIG. 3 is an exploded perspective view of a game card of the present invention.

FIG. 3 shows a second adaptation of item 10, i.e. card 50, that integrates additional ink layers and coatings to enhance the security, durability, and recreational use of items of the present invention. The construction of card 50 is particularly suitable for a game of chance in which the result of the game is initially hidden from view. In card 50, for example, game indicia 61 are initially hidden from view by a "scratch off" coating 70.

Base 52 of card 50 may suitably be constructed of paper, which may itself be conventional eight or ten point boardstock. Metallic ink 54, formulated as previously discussed, is coated atop base 52. An undercoat could be printed between base 52 and metallic ink 54, as in items 10 and 30, if desired. Holographic image 55 is impressed into metallic ink 54 in the region of metallic ink 54 that is unobstructed by scratch-off coating 70 and the other layers. Holographic image 55 provides an attractive visual display and inhibits photocopying of card 50. Overcoat 56, formulated as previously discussed, is coated over metallic ink 54 to enhance the durability and reflectivity of card 50. As with items 10 and 30, holographic image 55 could also be impressed into overcoat 56.

A foundation coating 58 is printed over a portion of overcoat 56. Foundation coating 58 comprises a dark-colored, solvent soluble ink in a vinyl chloride base resin. Foundation coating 58 binds overcoat 56 with any additional layers of card 50 printed atop foundation coating 58. A contrast coating 60 is printed atop foundation coating 58 that acts as the visible background for game indicia 61, and the base to which game indicia 61 are printed. Contrast coating 60 suitably may comprise a vinyl chloride resin dissolved in acetate solvent, tinted with titanium dioxide pigment.

Seal coating 62 covers game indicia 61 and functions as a barrier to seal the game indicia from other coatings applied to card 50. A second sealant 64 may also be included to ensure adequate coverage of the sealant material and sufficient protection of game indicia 61. Either or both of seal coating 62 and second sealant 64 may be a transparent or tinted water-white solution of vinyl chloride resin.

First and second release coats 66 and 68 respectively are applied over second sealant 64. The release coats allow scratch-off coating 70, which is applied atop the release coats, to release cleanly from card 50 when abraded, for example, by a coin. Release coats 66 and 68 are preferably clear and may contain alcohol soluble polyamide resin and zinc stearate, with second release coat 68 additionally containing silicone for added release properties.

First scratch-off coating 70 is applied atop second release coat 68. First scratch-off coating 70 may be an opaque, black latex comprised of solvent-soluble synthetic rubber with predispersed pigment and is available from KVK USA, 19A Home News Road, New Brunswick, N.J. 08901. Second scratch-off coating 72, applied atop first scratch-off coating 70, is also an opaque, solvent-soluble synthetic rubber containing predominantly metal particles and black pigment. First and second scratch-off coatings 70 and 72 combine to prevent viewing of game indicia 61, and also to inhibit tampering by which game indicia 61 could be learned prematurely. First and second scratch-off coatings 70 and 72 are readily separated from card 50 by a player of the game when the player abrades and scratches the coatings off of card 50.

Overprint ink 74 may also be applied to card 50 over scratch-off coating 72. Overprint ink 74 improves the durability of the scratch-off coatings, but does not significantly inhibit removal of the coatings when abraded.

The structure and configuration of card 50 could, of course, be varied significantly from the structure illustrated in FIG. 3, particularly with respect to the location of holographic image 76 in the card. Holographic image 76 could, for example, be located beneath scratch-off coating 70, and be exposed to view when scratch-off coating 70 is removed. The holographic image could be impressed onto a small block of metallic ink printed atop contrast coating 60. A metallic ink could similarly be printed atop scratch-off coating 72 and be impressed with a holographic image.

Indeed, the foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. An item comprising:
   a. a substrate; and
   b. a metallic ink coating, comprising a plurality of metallic particles suspended in a resinous ink binder, applied atop the substrate;
   wherein the ink coating is formed to have an impression that produces a holographic image.

2. The item of claim 1 wherein the metallic ink coating is the product of a solution comprising by weight approximately 32–33% ethyl acetate, 30–37% methyl ethyl ketone, 23–24% vinyl resin, 0–0.05% black dye and 8–12% aluminum pigment.

3. The item of claim 1 wherein the metallic ink coating is the product of a solution comprising by weight approximately 32.50% ethyl acetate, 36.45% methyl ethyl ketone 23.00% vinyl resin, 0.05% black dye, and 8.00% aluminum pigment.

4. The item of claim 1 wherein each of the plurality of metallic particles has a diameter, the average of the diameters being less than 5 microns.

5. The item of claim 4 wherein the metallic particles are in the shape of platelets.

6. The item of claim 1 further comprising a substantially tactile and nonresilient coating applied beneath the metallic ink coating and atop the substrate.

7. The item of claim 6 wherein the substantially tactile and nonresilient coating is a lacquer selected from the group consisting of acrylic lacquers, styrene acrylonitrile lacquers, polyethyleneterepthalate lacquers, and nitrocellulose lacquers.

8. The item of claim 6 wherein the substantially tactile and nonresilient coating has a thickness in the range of approximately 0.5 microns to 3 microns.

9. The item of claim 6 further comprising a substantially clear overcoat applied atop the metallic ink coating.

10. The item of claim 9 wherein the substantially clear overcoat is the product of a composition comprising between approximately 25–30% vinyl resin, 32–33% ethyl acetate, and 37–40% methyl ethyl ketone.

11. The item of claim 9 wherein the substantially clear overcoat is the product of a composition comprising approximately 32.25% ethyl acetate, 39.75% methyl ethyl ketone, and 28.00% vinyl resin.

12. The item of claim 9 wherein the substantially clear overcoat is the product of a composition selected from the group consisting of ultraviolet-curable materials and water-based acrylic resins.

13. The item of claim 1 further comprising symbols printed to the substrate.

14. The item of claim 9 further comprising a foundation coating applied atop the substantially clear overcoat, game symbols printed atop the foundation coating, a seal coating printed atop the game symbols, a release coating applied atop the seal coating, and a scratch-off coating applied atop the release coating.

15. An item comprising:
   a. a substrate;
   b. a metallic ink coating, comprising a plurality of metallic particles suspended in a resinous ink binder, applied atop the substrate; and
   c. a substantially clear overcoat applied atop the metallic ink coating;
   wherein the substantially clear overcoat and the metallic ink coating are formed to have an impression that produces a holographic image.

16. The item of claim 15 further comprising a substantially tactile and nonresilient coating applied beneath the metallic ink coating and atop the substrate.

17. An item comprising:
   a. a substrate;
   b. a metallic ink coating, comprising a plurality of metallic particles suspended in a resinous ink binder, applied atop the substrate; and
   c. a substantially clear overcoat applied atop the metallic ink coating;
   wherein the substantially clear overcoat is formed to have an impression that produces a holographic image.

18. The item of claim 17 further comprising a substantially tactile and nonresilient coating applied beneath the metallic ink coating and atop the substrate.

19. A process for producing a holographic image comprising the steps of:
   a. providing a substrate;
   b. printing a metallic ink, comprising a plurality of metallic particles suspended in a resinous ink binder, atop the substrate; and
   c. impressing a holographic shim into the metallic ink.

20. The process of claim 19, further comprising the step of printing a substantially tactile and nonresilient coating between the substrate and the metallic ink.

21. The process of claim 20, further comprising the step of printing a substantially clear overcoat atop the metallic ink.

22. The process as set forth in claim 19, wherein the step of printing comprises a step of flexographic printing.

23. The process as set forth in claim 19, wherein the step of printing comprises a step of rotogravure printing.

24. A card, comprising:
   a. a substrate; and
   b. a metallic ink coating comprising a plurality of metallic particles applied on the substrate;
   wherein the metallic ink coating is for receiving an impression that produces a holographic image.

25. The card as set forth in claim 24, further comprising game indicia printed on a surface of the card.

26. The card as set forth in claim 25, wherein the surface upon which the game indicia is printed comprises a surface of the substrate.

27. The card as set forth in claim 25, further comprising a foundation coating applied to the substrate and wherein the surface upon which the game indicia is printed comprises a surface of the foundation coating.

28. The card as set forth in claim 25, further comprising a scratch off coating applied over the game indicia.

29. The card as set forth in claim 28, further comprising a release coat between the scratch off coating and the game indicia.

30. The card as set forth in claim 24, further comprising an overcoat applied over the metallic ink coating.

31. The card as set forth in claim 30, wherein the overcoat and the metallic coating are for receiving the impression for producing the holographic image.

* * * * *